United States Patent [19]

Bauerle

[11] Patent Number: 4,929,260

[45] Date of Patent: May 29, 1990

[54] ADJUSTABLE AIR CLEANER FASTENING ASSEMBLY

[75] Inventor: David D. Bauerle, St. Clair Shores, Mich.

[73] Assignee: Colt Industries Inc., New York, N.Y.

[21] Appl. No.: 419,815

[22] Filed: Oct. 11, 1989

Related U.S. Application Data

[63] Continuation of Ser. No. 164,128, Mar. 4, 1988, abandoned.

[51] Int. Cl.[5] .............................................. B01D 46/00

[52] U.S. Cl. ................................ 55/510; 55/DIG. 28; 411/400; 411/383; 411/389; 403/11

[58] Field of Search .......................... 55/510, DIG. 28; 411/400, 383, 388, 401, 389; 403/11

[56] References Cited

U.S. PATENT DOCUMENTS

| | | | |
|---|---|---|---|
| 2,927,496 | 3/1960 | Goodman | 411/383 |
| 3,150,890 | 9/1964 | Sego et al. | 411/400 |
| 3,541,765 | 11/1970 | Adler et al. | 55/510 |
| 3,856,247 | 12/1974 | Keighley | 411/401 |
| 3,880,090 | 4/1975 | Duclos | 411/400 |
| 4,233,043 | 11/1980 | Catterson | 55/DIG. 28 |
| 4,735,640 | 4/1988 | Thornburgh et al. | 55/510 |
| 4,802,902 | 2/1989 | Bauerle et al. | 55/DIG. 28 |

FOREIGN PATENT DOCUMENTS

| | | | |
|---|---|---|---|
| 71074 | 10/1946 | Norway | 85/9 R |
| 136372 | of 1912 | United Kingdom | 411/389 |
| 16858 | of 1913 | United Kingdom | 411/389 |

*Primary Examiner*—Tim Miles

*Attorney, Agent, or Firm*—Howard S. Reiter

[57] ABSTRACT

An adjustable air cleaner fastening assembly adapted for interconnecting predetermined centers of an air cleaner cover or housing and carburetor on an engine, the centers being eccentric. A base fastening portion engages the predetermined center of the carburetor on the engine. An air cleaner housing or cover fastening portion engages the base fastening portion and the predetermined center of the air cleaner cover for adjustably maintaining a predetermined distance between the predetermined center of the air cleaner cover and the predetermined center of the carburetor.

8 Claims, 2 Drawing Sheets

ADJUSTABLE AIR CLEANER FASTENING ASSEMBLY

RELATED APPLICATION

This application is a Continuation of my copending application Ser. No. 164,128 filed Mar. 4, 1988, now abandoned, for Adjustable Air Cleaner Fastening Assembly.

TECHNICAL FIELD

The subject invention relates to an adjustable fastening assembly for use on an engine and, more particularly, to an adjustable air cleaner stud for use between an air cleaner cover and a carburetor on an engine.

BACKGROUND OF THE INVENTION

Air cleaners are used on engines to filter contaminants from the air before passing through the carburetor to the internal cylinders of the engine. Typically, the air cleaners comprised a filter encased in an air cleaner cover and mounted upon the carburetor. The air cleaner cover has a center hole parallel and concentric to the center hole of the carburetor. This allowed a straight fastener or stud to be used to secure the air cleaner cover to the carburetor along a common axis.

Presently, the automotive industry is producing air cleaner covers having a center hole eccentric or offset from the center hole of the carburetor. This has resulted in a wide variety of different carburetor to air cleaner cover center to center hole spacing.

The problem is that a different fastening assembly has to be used for each different center to center hole spacing. This requires a costly inventory of fastening assemblies to be maintained.

SUMMARY OF THE INVENTION

Accordingly, the subject invention is an adjustable air cleaner fastening assembly adapted for interconnecting predetermined centers of an air cleaner cover and carburetor on an engine, the centers being eccentric. A base fastening means engages the predetermined center of the carburetor on the engine. A cover fastening means engages the base fastening means and predetermined center of the air cleaner cover for adjustably maintaining a predetermined distance between the predetermined center of the air cleaner cover and the predetermined center of the carburetor.

The subject invention allows for different center to center hole spacings between the various air cleaner covers and carburetors. This results in using one standard fastening assembly, eliminating the need for a large inventory of different fastening assemblies.

BRIEF DESCRIPTION OF THE DRAWINGS

Other advantages of the present invention will become apparent after viewing the accompanying drawings wherein.

DESCRIPTION OF THE PREFERRED EMBODIMENT

Figure 1:
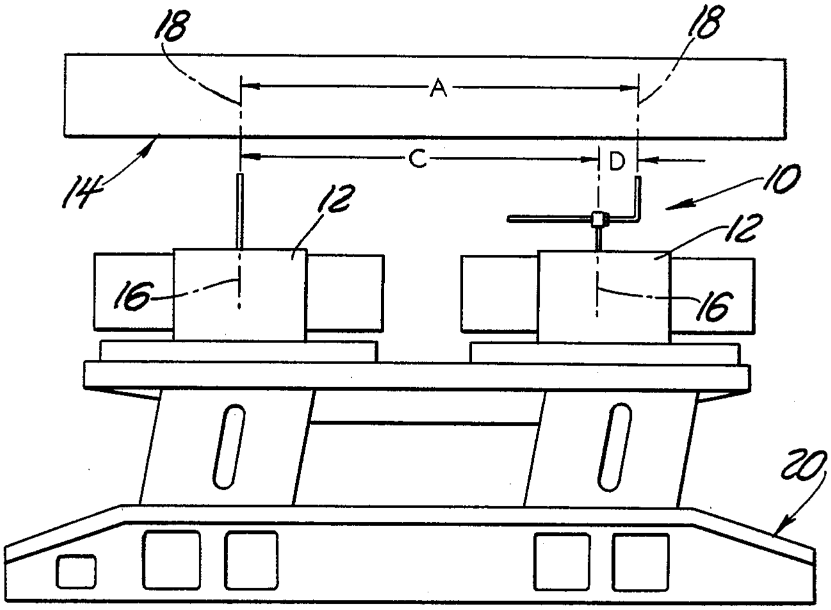
FIG. 1 is an elevational view of the subject invention used on an engine.

An adjustable air cleaner fastening assembly is generally shown at 10 in FIG. 1. The assembly 10 is adapted for interconnecting a carburetor 12 of an engine (not shown) and an air cleaner housing or cover 14. The carburetor 12 has a predetermined center 16 and the air cleaner housing or cover 14 has a predetermined center 18. The fastening assembly 10 secures the air cleaner cover 14 and the carburetor 12 together.

As shown in FIG. 1, a pair of laterally spaced carburetors 12 are connected to the intake manifold 20 of the engine. Each carburetor 12 has a predetermined center 16. A center hole or aperture is formed at the predetermined center 16. The air cleaner cover 14 has a pair of laterally spaced predetermined centers 18 separated by a distance A. A center hole or aperture is formed at the predetermined center 18. One predetermined center 18 of the air cleaner cover 14 is concentric with the predetermined center 16 of one of the carburetors 12. The other predetermined center 18 of the air cleaner cover 14 is eccentric or offset from the predetermined center 16 of the other carburetor 12.

Figure 2:
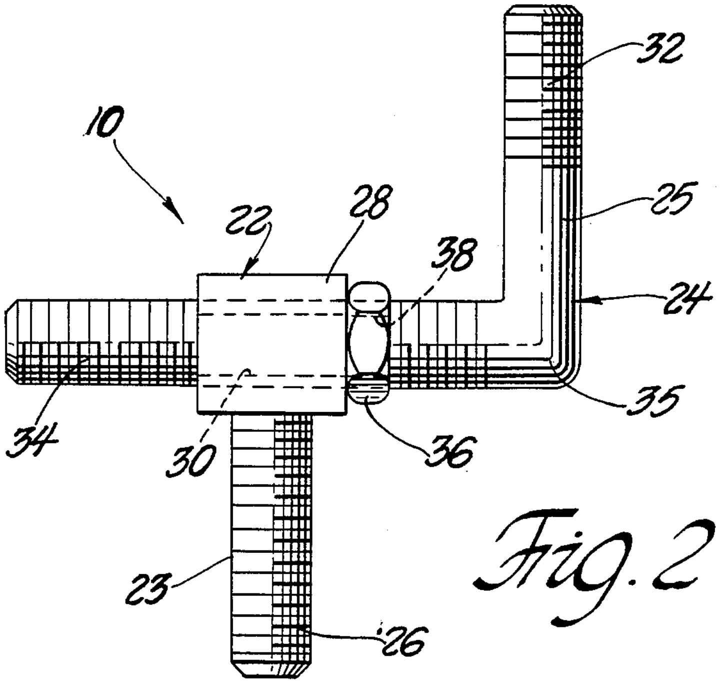
FIG. 2 is an elevational view of the subject invention.
Figure 3:
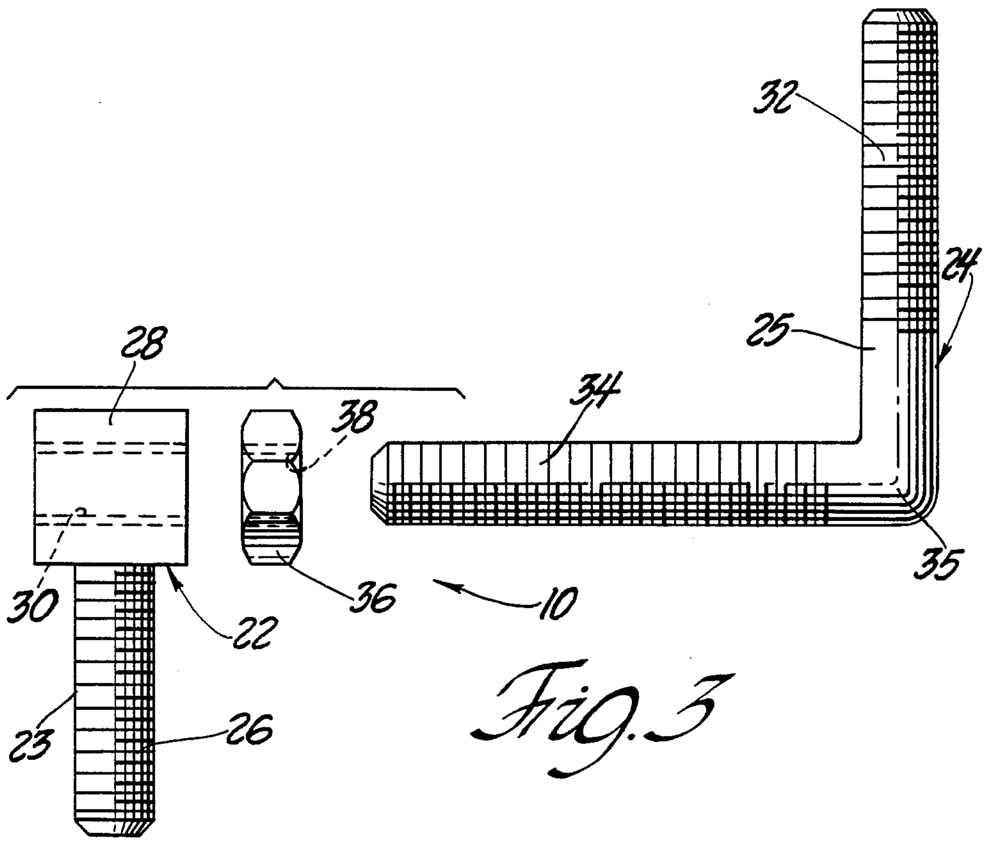
FIG. 3 is an exploded elevational view of the subject invention.

As illustrated in FIGS. 2 and 3, the fastening assembly 10 comprises a base fastening means 22 for threadably engaging the predetermined center 16 of the carburetor 12 and a cover fastening means 24 engaging the base fastening means 22 for threadably engaging the predetermined center 18 of the air cleaner cover 14 and for adjustably maintaining a predetermined distance D between the predetermined center 18 of the air cleaner cover 14 and the predetermined center 16 of the carburetor 12.

The base fastening means 22 comprises a base fastener or stud 23 having a threaded portion 26 at one end and an enlarged head portion 28 at the other end. The enlarged head portion 28 has a diameter greater than the diameter of the threaded portion 26. The enlarged head portion 28 includes an aperture 30 being threaded and communicating diametrically therethrough. The threaded portion 26 threadably engages the aperture at the predetermined center 16 of the carburetor 12.

The cover fastening means 24 comprises a cover fastener or stud 25 being L-shaped and having a first threaded portion 32 at one end and a second threaded portion 34 at the other end thereof. The first threaded portion 32 threadably engages the aperture at the predetermined center 18 of the air cleaner cover or housing 14 and the second threaded portion 34 threadably engages the aperture 30 of the base fastening means 22.

The assembly 10 also includes retaining means 36 for preventing relative movement between the cover fastening means 24 and the base fastening means 22. The retaining means 36 comprises a lock nut 36 having an aperture 38 being threaded and communicating therethrough. The lock nut 36 is threadably engagable with the cover fastening means 24. The lock nut 36 is disposed about the second threaded portion 34 between the enlarged head portion 28 of the base fastening means 22 and the bend 35 of the cover stud 25 to prevent the lock nut 36 from dropping down into the carburetor 12 and inflicting damage to the engine.

In operation, as illustrated in FIG. 1, the air cleaner cover or housing 14 has a predetermined center to center spacing A of 11 inches for example. The predetermined center to center spacing C of the carburetors 12 is 7 inches. Therefore, if one predetermined center 18 of the air cleaner cover 14 is concentric with one predetermined center 16 of the carburetors 12, a 4 inch predetermined distance or eccentric spacing D will remain between the other predetermined center 18 of the air cleaner cover 14 and the predetermined center 16 of the other carburetor 12.

The assembly 10 solves this problem. The stud 23 of base fastening means 22 is threaded into the aperture at the predetermined center 16 of the carburetor 12. The lock nut 36 is placed about the second threaded portion 34 between the base fastening means 22 and the bend 35 of the cover stud 25. The second threaded portion 34 of the cover stud 25 is threaded or screwed in or out of the aperture 30 of the base fastening means 22 until the first threaded portion 32 is at the predetermined center 18 to achieve the proper center to center spacing D and disposed in the aperture of the air cleaner cover 14. When the desired center to center spacing D is achieved, the lock nut 36 is tightened down against the head portion 28 of the base fastening means 22 to hold the cover stud 25 in an up-right position. The air cleaner cover 14 is secured to the cover stud 25 by a suitable fastener such as a nut (not shown), which is coupled to the upper-end of the first threaded portion 32 of cover stud 25 after the stud has been inserted through the openings 18 in the air cleaner cover 14 so as to urge the air cleaner 14 into engagement with the carburetor 12. Thus, the center to center spacing C between the carburetors 12 is extended by the fastening assembly 10 to 11 inches to allow the air cleaner cover 14 to be secured to the carburetors 12.

Figure 4:
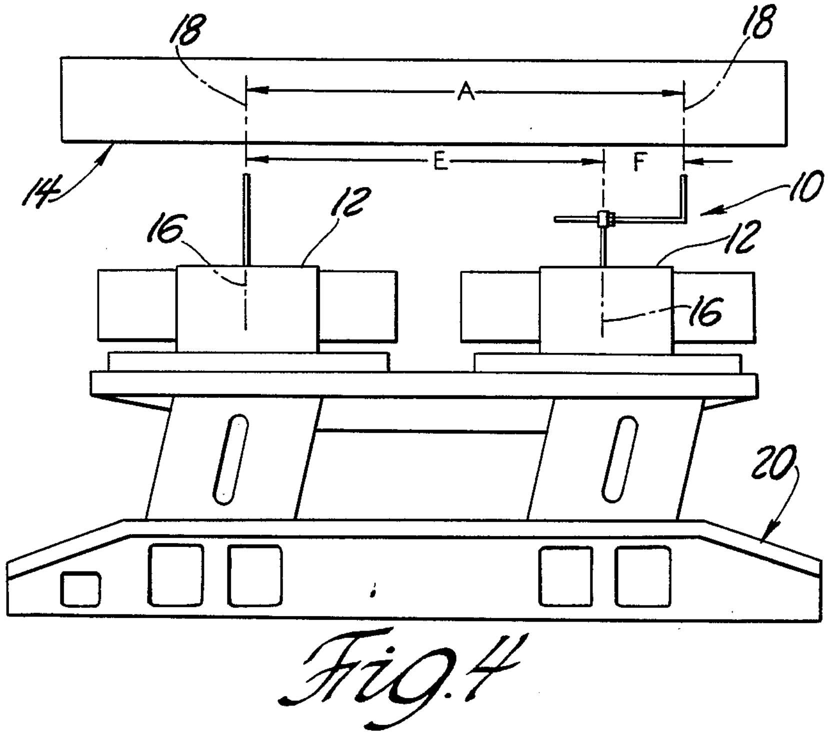
FIG. 4 is an elevational view of the subject invention on an engine having a different carburetor center to center spacing than FIG. 1.

As illustrated in FIG. 4, the center to center spacing E of the carburetors is 6 inches. Thus, the cover stud 25 is adjusted by turning or screwing it out of the head portion 28 of the base fastening means 22 until the first threaded portion 32 is at a predetermined distance F of 5 inches from the predetermined center 16 of the carburetor 12. Thus, the center to center spacing E between the carburetors 12 is extended by the fastening assembly 10 to 11 inches to allow the air cleaner cover 14 to be secured to the carburetors 12.

The present invention has been described in an illustrative manner and it is to be understood that the terminology which has been used is intended to be in the nature of words of description rather than of limitation.

Obviously, many modifications of the present invention are possible in light of the above teachings. It is, therefore, to be understood that within the scope of the appended claims, the present invention may be practiced otherwise than as specifically described.

What is claimed is:

1. An adjustable air cleaner assembly interconnecting predetermined centers of an air cleaner cover and a carburetor on an engine, the centers being eccentric, said assembly comprising in combination base fastening means threadably engaging the predetermined center of a carburetor of an engine, said base fastening means comprising a base stud having a threaded portion at one end threadably engaging an aperture at the predetermined center of the carburetor and an enlarged head portion at the other end having a diameter greater than the diameter of said threaded portion, said enlarged head portion having an aperture communicating diametrically therethrough and being threaded, and cover fastening means engaging said base fastening means and the predetermined center of said air cleaner cover and adjustably maintaining a predetermined distance between the predetermined centers of the air cleaner cover and the carburetor, said cover fastening means comprising a cover stud being L-shaped and having a threaded portion at each end thereof, the threaded portion at one end of said cover fastening means being disposed in an aperture at the predetermined center of the air cleaner cover and the threaded portion at the other end of said cover fastening means being threadably engageable with said aperture.

2. The combination according to claim 1 and further comprising retaining means for preventing relative movement between said cover fastening means and said base fastening means, said retaining means comprising a lock nut having an aperture communicating therethrough and being threaded, said lock nut being threadably engageable with the threaded portion of said other end of said cover stud between said enlarged head portion of said base stud and the threaded portion of said one end of said cover stud thereby capturing said lock nut to said assembly while said cover fastening means is engaged with said base fastening means.

3. An adjustable air cleaner assembly interconnecting predetermined centers of an air cleaner cover and a fuel metering apparatus on an engine, the centers being eccentric, said assembly comprising in combination base fastening means threadably engaging the predetermined center of a fuel metering apparatus of an engine, said base fastening means comprising a base stud having a threaded portion at one end threadably engaging an aperture at the predetermined center of the fuel metering apparatus and a head portion at the other end, said head portion having an aperture communicating diametrically therethrough and being threaded, and cover fastening means engaging said base fastening means and the predetermined center of said air cleaner cover and adjustably maintaining a predetermined distance between the predetermined centers of the air cleaner cover and the fuel metering apparatus, said cover fastening means comprising a cover stud being L-shaped and having a threaded portion at each end thereof, the threaded portion at one end of said cover fastening means being disposed in an aperture at the predetermined center of the air cleaner cover and the threaded portion at the other end of said cover fastening means being threadably engageable with said aperture.

4. The combination of an adjustable air cleaner fastening assembly interconnecting predetermined centers of an air cleaner cover and a fuel metering device such as a carburetor on an engine, the centers being eccentric, said assembly comprising in combination a pair of laterally spaced fuel metering devices on an engine each having a predetermined center, an air cleaner cover having a pair of laterally spaced predetermined centers, one of said predetermined centers of said air cleaner cover being concentric with one predetermined center of said fuel metering devices and the other said predetermined center of said fuel metering devices, base fastening means for threadably engaging said predetermined center of said fuel metering device of an engine, said base fastening means comprising a base stud having a threaded portion at one end for threadably engaging an aperture at said predetermined center of said fuel metering device and an enlarged head portion at the other end having a diameter greater than the diameter of said threaded portion, said enlarged head portion having an aperture communicating diametrically therethrough and being threaded, cover fastening means engaging said base fastening means and said predetermined center of said air cleaner cover and for adjustably maintaining a predetermined distance between the predetermined centers of the air cleaner cover and the fuel metering device, said cover fastening means comprising a cover stud being substantially L-shaped and having a threaded portion at each end thereof, the threaded portion at one end being disposed in an aperture at the predetermined center of the air cleaner cover and the threaded portion at other end being threadably engageable with said aperture, and retaining means for preventing relative movement between said cover fastening means and said base fastening means, said retaining means comprising a lock nut having an aperture communicating therethrough and being threaded, said lock nut being threadably engaged with the threaded portion of said other end of said cover stud between said enlarged head portion of said base stud and the threaded portion of said one end of said cover stud thereby capturing said lock nut to said assembly while said cover fastening means is engaged with said base fastening means.

5. The combination of an engine for receiving combustible mixtures of air and fuel, structure defining induction passage means communicating with said engine for the flow of air through said induction passage means to said engine, air cleaner housing means through which air flows on its travel to said induction passage means of said structure, and securing means securingly connecting said air cleaner housing means to said structure defining said induction passage means as to hold said air cleaner housing means and said structure defining said induction passage means in assembled relationship, wherein said air cleaner housing means comprises first aperture means for the reception therein of a first portion of said securing means, wherein said structure defining said induction passage means comprises an anchoring portion for securing a second portion of said securing means, wherein said first aperture means comprises a first axis extending therethrough, wherein said anchoring portion comprises a second axis, wherein when said air cleaner housing means is securingly connected to said structure defining induction passage means said first axis and said second axis are generally parallel to each other and transversely spaced from each other as to be considered eccentrically situated with respect to each other, and wherein within said combination said securing means comprises in combination first and second securing members, wherein one of said securing members is of an L-shaped configuration having first and second axially extending leg portions respectively having third and fourth axes, wherein the other of said securing members comprises a shank like leg portion having a fifth axis and a body portion, wherein said body portion comprises second aperture means with a sixth axis formed therethrough, wherein one of said leg portions is secured to said anchoring portion as to have the axis of said one leg portion generally aligned with said second axis of said anchoring portion, wherein an other of said leg portions extends through said first aperture means of said air cleaner housing means in securing connection thereto and whereby the axis of said other leg portion is in general alignment with said first axis of said first aperture means, wherein a third of said leg portions extends at least into said second aperture means as to have the axis of such third leg portion in general alignment with said sixth axis of said second aperture means formed in said body portion, and wherein such third leg portion and said second aperture means and body portion are axially adjusted with respect to each other as to have the distance between said axis of said first leg portion and the axis of said other leg portion substantially equal to the distance by which said first and second axes are transversely spaced from each other.

6. The combination according to claim 5 wherein said one of said leg portions comprises said shank like leg portion having said fifth axis, wherein said other of said leg portions comprises said second axially extending leg portion of said one of said securing members, and wherein said third leg portion comprises said first axially extending leg portion of said one of said securing members.

7. The combination according to claim 5 wherein said air cleaner housing means comprises third aperture means, wherein said structure defining said induction passage means comprises a second anchoring portion, wherein said securing means comprises second securing means also securingly connecting said air cleaner housing means to said structure defining said induction passage means, wherein said third aperture means comprises a seventh axis extending therethrough, wherein said second anchoring portion comprises an eighth axis, wherein said second securing means comprises an axially elongated fastening member having axially spaced first and second fastening end portions, wherein said axially elongated fastening member comprises a ninth axis and wherein said first and second fastening end portions are in substantial alignment with each other and with said ninth axis, wherein said seventh axis is generally parallel to each of said first and second axes and transversely spaced therefrom, wherein said eighth axis is generally parallel to each of said first and second axes and transversely spaced therefrom, wherein said first fastening end portion is secured to said second anchoring portion as to have said ninth axis of said elongated fastening member in general axial alignment with said eighth axis, and wherein said second fastening end portion extends through said third aperture means of said air cleaner housing means in securing connection thereto.

8. The combination according to claim 7 wherein said one of said leg portions comprises said shank like leg portion having said fifth axis, wherein said other of said leg portions comprises said second axially extending leg portion of said one of said securing members, and wherein said third leg portion comprises said first axially extending leg portion of said one of said securing members.

* * * * *